(12) United States Patent
Bambot et al.

(10) Patent No.: US 12,544,026 B2
(45) Date of Patent: Feb. 10, 2026

(54) METHOD AND APPARATUS FOR BREAST IMAGING

(71) Applicant: Shabbir Bakir Bambot, West Hills, CA (US)

(72) Inventors: Shabbir Bakir Bambot, West Hills, CA (US); James M. Carver, Cottage Grove, OR (US); Joshua Lee, Anaheim, CA (US)

(73) Assignee: Shabbir Bakir Bambot, West Hills, CA (US)

( * ) Notice: Subject to any disclaimer, the term of this patent is extended or adjusted under 35 U.S.C. 154(b) by 308 days.

(21) Appl. No.: 18/499,206

(22) Filed: Oct. 31, 2023

(65) Prior Publication Data
US 2024/0057959 A1    Feb. 22, 2024

Related U.S. Application Data

(60) Continuation-in-part of application No. 17/403,246, filed on Aug. 16, 2021, now abandoned, which is a division of application No. 16/499,956, filed as application No. PCT/US2018/029567 on Apr. 26, 2018, now Pat. No. 11,090,016.
(Continued)

(51) Int. Cl.
*A61B 6/50*   (2024.01)
*A61B 6/00*   (2006.01)
*A61B 6/02*   (2006.01)
*A61B 6/04*   (2006.01)
*A61B 6/06*   (2006.01)
*A61B 6/42*   (2024.01)

(52) U.S. Cl.
CPC ............. *A61B 6/502* (2013.01); *A61B 6/022* (2013.01); *A61B 6/0435* (2013.01); *A61B 6/0492* (2013.01); *A61B 6/06* (2013.01); *A61B 6/4208* (2013.01); *A61B 6/542* (2013.01); *A61B 6/545* (2013.01); *A61B 2562/0261* (2013.01)

(58) Field of Classification Search
CPC .... A61B 6/00; A61B 6/02; A61B 6/04; A61B 6/06; A61B 6/022; A61B 6/0414; A61B 6/0435; A61B 6/0492; A61B 6/4208; A61B 6/502; A61B 6/542; A61B 6/545; A61B 6/4435; A61B 2562/0261
See application file for complete search history.

(56) References Cited

U.S. PATENT DOCUMENTS 6,416,218 B1 * 7/2002 Cheung ................. A61B 6/548
378/207

* cited by examiner

*Primary Examiner* — Jurie Yun
(74) *Attorney, Agent, or Firm* — Carroll, Hoette & Butscher LLC; Josef L. Hoffmann

(57) ABSTRACT

To improve breast mammography imagery via use of a digital "slot scanning" imaging system that accommodates the changing thickness of the breast from the chest wall to the nipple by scanning the breast from the chest outward to the nipple or vice versa instead of the side-to-side methodology and using Automatic Exposure Control or AEC parameters optimized for the changing thickness and composition of the breast at each scan location and an improved breast compression device, wherein uniform breast compression mechanism includes a first breast plate and a second breast plate, wherein at least one of said first breast plate and said second breast plates includes an angle adjustment or tilt to account for the high variability in breast sizes and configurations while maintaining optimal immobilization with excellent patient comfort.

13 Claims, 8 Drawing Sheets

Related U.S. Application Data

(60) Provisional application No. 62/500,094, filed on May 2, 2017.

METHOD AND APPARATUS FOR BREAST IMAGING

RELATED APPLICATION

The present application is a continuation-in-part to U.S. Patent Publication No. 2022/0054101 that was filed Aug. 16, 2021 that was a divisional application of U.S. Pat. No. 11,090,016 entitled Apparatus and Method for Digital Scan Mammography filed Apr. 26, 2018 that was a U.S. National Stage Filing under 35 U.S.C. 371 from International Application No. PCT/US2018/029567, filed on Apr. 26, 2018 and published as WO2018/204159, which claims priority to and the benefit of U.S. Provisional Application Ser. No. 62/500,094, filed on May 2, 2017, all of which are incorporated by reference herein.

BACKGROUND

The invention generally relates to mammography.

Mammography is considered to be one of the most demanding and challenging applications of radiographic medical imaging. The resolution of mammography systems, compared to other radiographic medical applications, must be high in order to detect the earliest lesions and/or masses and must be capable of obtaining images with a resolution on the order of fifty microns or better in order to do so. Contrast requirements are similarly demanding since the differences in radio-opacities between potential cancer and surrounding "healthy" tissue are quite subtle. Mammography is also a procedure that is generally disliked by patients who while acknowledging its benefits often avoid it because of the discomfort and pain from breast compression necessary to get good images. Methods and mechanisms that can help alleviate this discomfort and pain are therefore highly desirable in order to improve patient compliance with mammography testing recommendations.

Many mammography systems are referred to as Full Field Digital Mammography (FFDM) systems. FFDM systems transmit radiation that consists of two types of X-ray photons, primary and scattered. Primary photons are those whose trajectory is not changed upon passing through tissue, but their number may be attenuated by features in the tissue. This attenuation shows up as brighter areas on the captured X-ray image and is of diagnostic importance. The scattered photons trajectories are significantly altered upon passing through tissue. They impinge on the detector from a path outside a "direct" or substantially straight path from the radiation source to the detector. Problematically, these photons do not provide any diagnostic benefit and on the contrary cause random noise and other artifacts in the image. Accordingly, mammographic images should ideally be generated "scatter-free".

Various attempts have been made at reducing the incidence of scatter in radiographic imaging. For instance, anti-scatter grids consisting of a series of parallel strips of lead placed between the patient and the detector during the exposure are used in FFDM systems to reduce the amount of scatter. Primary photons pass through between the strips as they travel roughly parallel to them, but scattered photons which have, by definition, deviated from the parallel or direct path, cannot easily pass through the grid as they encounter the lead strips at an angle, and are therefore removed from the beam. However, use of these grids generally coincides with a need for significant increase in tissue radiation to make up for the lost radiation in order to generate images of desired resolution, signal-to-noise ratio and/or contrast.

In addition, mammography requires vigorous breast compression for many reasons. These include holding the breast still and motionless during the measurement in order to reduce blurring artifact, to hold the breast away from the chest wall so that the entire breast tissue along with a small portion of the chest muscle is imaged, a requirement of mammography adequacy and to minimize X-ray radiation dosage. Clearly, the thinner you can make anything you're X-raying the lower the dose that you'll need to use, so by thinning the breast we can use a lower X-ray dose. However, in order to get a more uniform image over the entire breast, it is made to conform to a constant thickness (flat compression) by squeezing the breast between two parallel surfaces or plates called paddles. During a screening procedure, mammography systems capture an X-ray image of the entire breast at once. In other words both the posterior or back portion of the breast (at the chest wall) as well as the anterior or front portion of the breast (at the nipple) are irradiated and imaged at the same time. If the breast is not flattened to a constant thickness, then radiation passing through the thicker posterior of the breast will cause the image to be under-exposed. On the other hand, if sufficient radiation is used so that the posterior is properly exposed or in other words, well-penetrated by X-rays so that the details can be seen then the anterior of the breast will be over-exposed since there will be too much X-ray that gets through. So the compression is used to reduce and equalize the thickness, making its thickness constant or flat so that the image is more easily interpreted.

Breasts, however, are cone shaped with the posterior portion being larger than the anterior. With flat compression, the posterior part of the breast is compressed too much and often uncomfortable or painful and cause bruising while the anterior part of the breast may not be compressed at all. It is therefore desirable to make a measurement by alleviating the pain and discomfort of breast compression to achieve better compliance with mammography recommendations.

SUMMARY

Provided herein are systems, methods and apparatuses for Digital Scan Mammography.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

In one or more example embodiments, an imaging system for imaging breast tissue of a breast is provided that can include an x-ray tube configured to move to different positions and a collimator coupled to the x-ray tube and configured emit an x-ray beam from the x-ray tube onto the breast, the collimator further configured to move with the x-ray tube to the different positions. The imaging system can also include a line detector positioned underneath the x-ray tube and the collimator and configured to receive the x-ray beam emitted from the collimator, the line detector further configured to move with the x-ray tube and collimator to the different positions. In a first position the x-ray tube and collimator align with line detector, and in a second position the x-ray tube and collimator also align with the line detector.

Optionally, when the x-ray and collimator align with the line detector, the x-ray beam may be orthogonal to the line detector. In one aspect, the collimator may be a first distance from the line detector in the first position and is a second distance from the line detector in the second position. In another aspect, the first position can result in the x-ray beam being adjacent to a chest wall, and the second position can result in the x-ray beam transmitting through a middle portion of the breast. In one example the first position results in the x-ray beam being adjacent a chest wall, and the second position results in the x-ray beam being adjacent a nipple. In another example, the first position results in the x-ray beam being adjacent a nipple, and the second position results in the x-ray beam being adjacent a chest wall. Optionally, the x-ray beam can be a fan beam.

In one or more example embodiments, an imaging system for imaging breast tissue of a breast is provided that includes a beam emitter configured to emit a beam directed toward a breast, and a scintillator positioned to receive the beam directed toward the breast and generate light in response to receiving the beam. The imaging system may also include an arcuate fiber optic bundle configured to receive the light from the scintillator and carry the light to a receptor. The light received by the receptor may be utilized to form an image of the breast.

Optionally, the scintillator can be a phosphor. In one aspect, the receptor can be coupled to a printed circuit board to form a sensor. In another aspect the arcuate fiber optic bundle may be positioned relative to the receptor so that beam emitted by the beam emitter does not strike an electrical component on the printed circuit board. In one example the arcuate fiber optic bundle can extend from a first end positioned orthogonal to the light from the scintillator to a second end positioned so the light received by the receptor is orthogonal to the receptor. In another example, the sensor can be a time delay integration (TDI) line sensor. In yet another example the scintillator can be coupled to the arcuate fiber optic bundle.

In one or more embodiments an imaging system for detecting light for imaging breast tissue of a breast is provided that may include a scintillator positioned to receive a beam after the beam has translated through a breast, the scintillator configured generate light in response to receiving the beam, and an arcuate fiber optic bundle configured to receive the light from the scintillator and carry the light to a receptor. The receptor can be configured to receive the light from the arcuate fiber optic bundle and transmit a signal configured to be utilized to form an image based on the light received by the sensor.

Optionally, the imagining system also includes a printed circuit board that includes the receptor and at least one electronic component that is electrically connected to the receptor. In one aspect the arcuate fiber optic bundle can be positioned relative to the detector so that the beam is not emitted on the at least one electrical component on the printed circuit board. In one example, the arcuate fiber optic bundle can extend from a first end positioned orthogonal to the light from the scintillator to a second end positioned so the light received by the receptor is orthogonal to the receptor. In another example the detector system may be a time delay integration (TDI) line detector. In yet another example the scintillator can be a phosphor.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
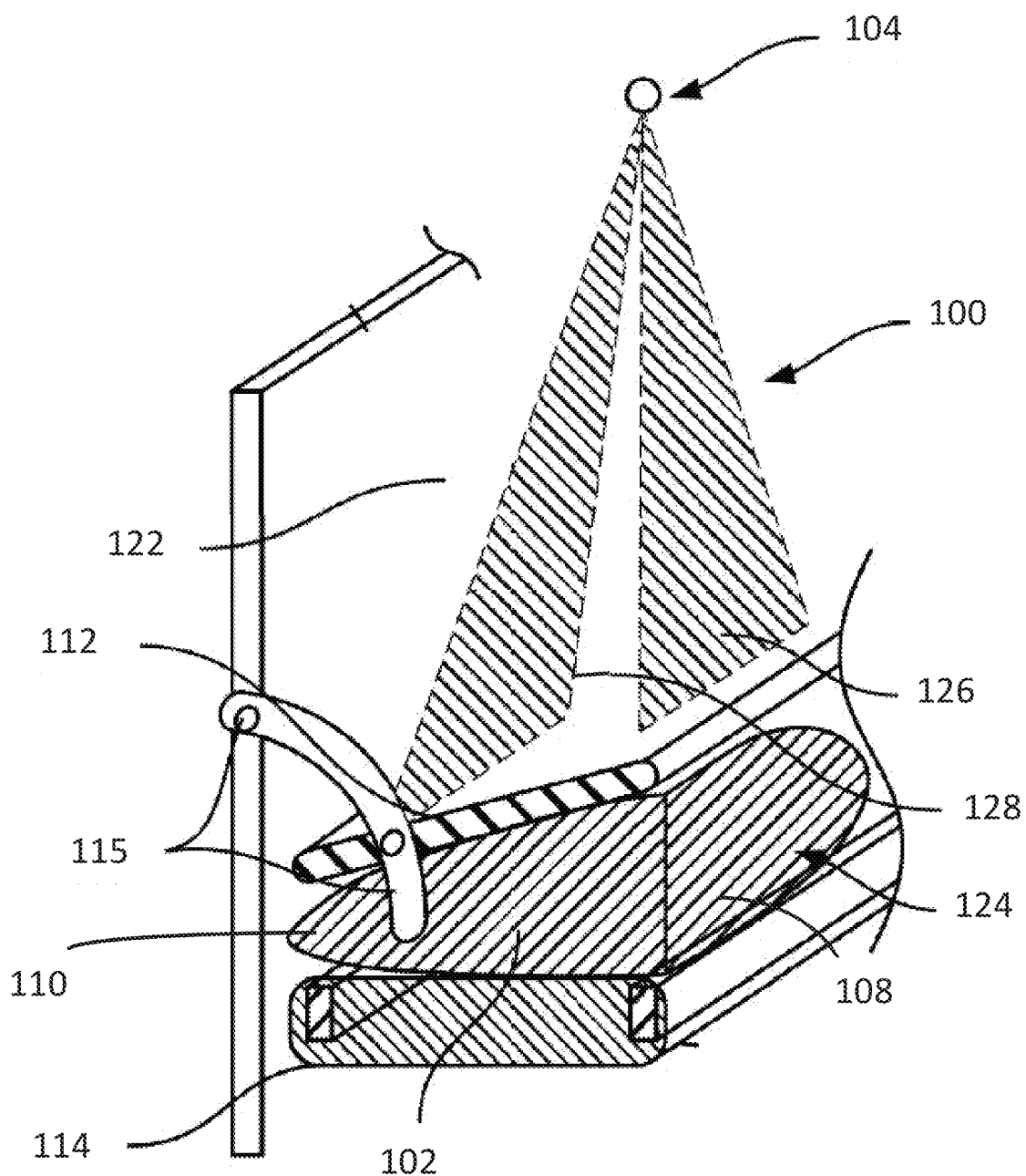
FIG. 1 is a schematic diagram of a system for digital mammography according to one embodiment.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. The words anterior and posterior are applied herein with respect to the patient (Anterior refers to the nipple portion of the patient. Posterior refers to the chest wall with respect to a patient and/or the implant.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Provided is a radiographic imaging system, device, and associated method for reducing effects related to scattered radiation or scatter and to obtain improved imaging performance. Relatedly, provided is producing an image with optimal and uniform Signal to Noise Ratio (SNR) and Contrast to Noise Ratio (CNR) over the entire breast area by modulating the exposure settings depending upon the thickness of tissue. Also provided is a system and method that improves compliance with mammography recommendations by reducing the pain and discomfort from breast compression during a mammography examination.

In mammography, reducing the effects related to scatter can improve the contrast (for given imaging parameters) of features being imaged such as lesions, masses, calcifications and the like. Such scatter effects are reduced according to the present invention as explained in the following paragraphs making it easier to detect such features. This imaging improvement may allow for various additional advantages including, but not limited to, reduced patient dosages, reduction in unnecessary procedures and better overall outcomes.

Slot scanning technology uses a narrow, tightly collimated X-ray beam that scans the tissue while being in precise alignment with a narrow-slotted image detector that is operated in Time Delay Integration (TDI) mode. To image the full area of interest, the narrow, highly collimated, X-ray beam to scan the tissue in precise alignment with a slotted (line shaped) detector and a composite image of the full area of interest is constructed from the incrementally obtained information. In doing so, significant scatter rejection is achieved because radiation outside of the plane (i.e. outside of a thin fan shaped beam) including the signal source and the active detector area is not recorded as part of the image forming information. In TDI, the scan speed is exactly matched to the speed at which signal is read off a detector to produce the incrementally constructed image. The scanned TDI approach provides significant advantages including, but not limited to, reducing the effects of scattered radiation, providing for full field breast imaging and reducing the required radiation dosage. As will be discussed in the ensuing, slot scanning also enables reducing the pain and discomfort from breast compression during a mammography examination.

Additionally, an important aspect of any FFDM system is Automatic Exposure Control (AEC). AEC algorithms optimize and select, without any user intervention, parameters (commonly known as technique) such as the peak kilovoltage (kVp), the current used (milli Amperes or mAs), the exposure duration and the target/filter combination for the X-ray measurement for a given breast thickness and density. The goal of the AEC is to produce an image with optimal and uniform Signal to Noise Ratio (SNR) and Contrast to Noise Ratio (CNR) throughout the image. In most FFDM systems a brief exposure (often referred to as a pre-exposure) is used to determine these parameters which are frequently different, for example, between the Cranio Caudal (CC) and Medio Lateral Oblique (MLO) views on the same patient. However, AEC parameters are required by design to be constant over the entirety of each image in FFDM systems.

Scanning systems require a different implementation of AEC. Because "Slot scanning" technology builds an image incrementally the technology provides an opportunity to vary AEC parameters within each image. Dynamic modulation of AEC parameters has been explored in the prior art. For example, Aslund, M and colleagues [AEC for scanning digital mammography based on variation of scan velocity. Med Phys. 2005 November; 32(11): 3367-74 which is incorporated herein in its entirety by reference] explored a velocity-modulation approach for a photon-counting scanning detector. In their approach, the detector-beam velocity changes during the clinical scan, based on photon count rates, in order to achieve an optimal signal to noise ratio throughout the image.

An apparatus and method for improved digital mammography comprises using "slot scanning" that accommodates uniform force or pressure in breast compression to make it less painful and more comfortable for the patient. "Uniform compression" is herein defined as a mostly even force or pressure applied at all points ranging between the anterior and posterior part of the breast. The compressive force applied in mammography can range from about 50 to about 200 Newton (about 10 to about 45 lb/f (about 50 to about 200 Newton) that can result in a pressure within the breast tissue of about 0.5 to about 5 psi depending upon the size and volume of breast tissue.

FIG. 1 illustrates a scanning system 100 that in one example is configured to scan a breast 102 of a patient. The scanning system 100 includes a beam emitter 104 that generates or emits a beam utilized for scanning the breast 102. In one example the beam emitter can be an X-ray generating a device, including as a result of X-ray diffraction, X-ray fluorescence, or the like. In other examples, the beam emitter 104 can be a laser, or other device that generates electromagnetic waves.

In operation, the breast 102 may be scanned from an anterior position 110 to a posterior position 108 (e.g., from front to back). Alternatively, the breast 102 can be scanned from the posterior position 108 to the anterior position. In either scanning, the scanning is performed while the breast 102 is held compressed between a top paddle 112 and a breast support 114. In examples, the top paddle 112 can be flat, generally conical in shape (e.g., to contour to the breast 102). Similarly, the breast support can be flat, generally conical, or the like.

In one embodiment, the scanning system 100 for digital mammography also includes a first tilting mechanism 115 and a second tilting mechanism (not shown) that are coupled to the top paddle 112 of the plates (i.e. the top paddle 112 and breast support 114) to provide an adjustable mutual tilt. To this end, the adjustable mutual tilt allows for a uniform force or pressure (uniform compression) to be applied to the breast 102. The cone shape of the breast is more comfortably accommodated when the separation between the plates is allowed to be larger near the chest wall 124 and smaller near the nipple. The uniform compression also reduces image artifacts that may arise from over-compression in some parts of the breast and under-compression in others.

In one example the second tilting mechanism can be the same shape and structure as the first tilting mechanism and is located at an opposite end of the top paddle 112. In one example the first tilting mechanism 115 includes a first arcuate body that extends from a first end that pivotably couples to the top paddle to provide the tilting, to a second end that is pivotably coupled to a stand 122. Similarly, the second tilting mechanism includes a second arcuate body (not shown) that also extends from a first end that pivotably couples to the top paddle to provide the tilting, to a second end that is pivotably coupled to the stand 122. In one example, the stand is a stationary body that extends between the first and second tilting mechanisms to provide an axis about which the arcuate bodies of each tilting mechanisms rotate.

In one embodiment, uniform compression force between plates with an adjustable mutual tilt helps hold the breast still and motionless and away from the chest wall so that the entire breast tissue along with a small portion of the chest muscle is imaged. In another embodiment, the breast support 114, or bottom plate, can be held at right angles to the vertical and the breast may be rested upon the breast support 114 while the top paddle 112 has an adjustable angle or tilt that the technician can then place to provide uniform compression on the breast 102. This adjustability can produce a natural tilt in the top paddle 112 and may account for the high variability in breast sizes and configurations while maintaining optimal immobilization with excellent patient comfort. This degree of tilt is manually recorded or can be recognized by sensors and this information is used to determine the changing thickness of the breast from the chest wall to the nipple.

In an alternate embodiment, no compression is applied allowing the breast to simply rest on the breast support and the breast assume its natural conical shape.

In one embodiment, the apparatus and method for improved digital mammography comprises using "slot scanning" with uniform force or pressure in breast compression by adopting a scanning methodology in which the narrow X-ray beam and the narrow-slotted image detector are scanned in a direction that is essentially orthogonal to and thereby different from the side-to-side scanning methodology taught by the prior art including U.S. Pat. No. 5,526,394 (cited above). Indeed U.S. Pat. No. 5,526,394 teaches away from the present invention by stating: "Movement of the receiver is preferably performed across the patient's chest (from side-to-side relative to the patient's breast) rather than transverse to the patient's chest wall (outward from the base of the patient's breast or vice versa) so that the scan is not interrupted by the chest wall, thereby facilitating a smooth scanning motion across the entire breast for enhanced imaging." In one embodiment, current FFDM systems can also use uniform (non-flat) compression but because they use cone beam radiation (which provides the same radiation over the entire breast) the thicker posterior of the breast may cause the image to be under-exposed and the thinner anterior may cause the image to be over-exposed.

Since the breast is cone shaped its thickness changes substantially from the posterior (chest wall) to the anterior (nipple) and this change in thickness is much more so than any change in thickness going from side to side (medial to lateral). Therefore this alternative scanning method scans over tissue of changing thickness.

In one embodiment the apparatus and method for improved digital mammography comprises using "slot scanning" with uniform force or pressure in breast compression by changing the AEC parameters to the most optimum valued depending upon the thickness of the breast tissue and optionally its other physical properties, such as glandularity at the scan position. This embodiment enables comfortable uniform compression.

In one embodiment, the thickness information is provided to the AEC processor for calculating the AEC parameters prior to making the measurement. The thickness may be between about 2 to about 20 cm. This permits changes in the AEC parameters from one scan position 126 to the next 128. For example, the AEC parameters such as kVp and mAs can be different for scan measurements near the chest wall as compared to the measurements near the nipple thereby providing for optimal and uniform SNR over the entire image. In this regard careful optimization of kVp and mA values may be needed. In general, doubling the tissue thickness reduces the penetration (P) by the square of the increase in thickness. So for example if we choose to double the thickness the penetration is reduced to a quarter (P=0.5 2=0.25). The half value layer (HVL) thickness is defined as the thickness of material that decreases penetration by 50%. The HVL thickness for tissue depends upon the type of tissue such as fatty, glandular, muscle etc. as well as the kVp and mAs used. Increasing the kVp increases the HVL thickness which may be needed when imaging thicker tissue such as tissue near the chest wall. In other words, increasing kVp increases penetration but because a higher kVp reduces the signal contrast between normal and tumor tissue, a tradeoff that makes it necessary to carefully optimize any increase in kVp. Meanwhile increasing mAs is also desirable in thicker tissue as this increases signal but here too optimization may be needed as a higher mAs increases radiation dose.

In one embodiment, beam 106 can be a thin fan shaped beam (as illustrated) used for scanning such as shown for scan positions 126 and 128. The beam 106 can be selected from the cone shaped radiation emerging from a beam emitter 104 such as an x-ray tube utilizing a collimator. The collimator can include a thin moving slit or aperture that permits a thin radiation beam to pass through while blocking other radiation from the x-ray tube. The movement of the slit can be precisely aligned with the movement of the detector such that the radiation may be continuously directed or aimed toward the detector.

In an alternate embodiment, both top and bottom plates (e.g. top paddle 112 and breast support 114) are provided with an adjustable tilt. It is understood that in scanning the breast 102 from the chest wall to the nipple, the scanning beam 106 may not be exactly parallel to the chest wall and small variations in the angle (from about 0° up to about 30°) between the chest wall and scan beam may be used to accommodate patient anatomy and patient positioning.

Notwithstanding the above, an alternative embodiment may use a narrow-slotted image detector that is composed of multiple sections each section of which can be independently addressed to provide for different detector related AEC parameters. In this case, side to side (i.e. medial to lateral) scanning can be used but the detector section near the chest wall will use AEC parameters that accommodate thicker tissue as compared to the detector section near the nipple.

A related aspect of the apparatus and method for improved digital mammography is to use surface features on the compressing plates that help them to "grab" onto the skin for better immobilization. Such features include surface texture, surface elasticity, protrusions or holes that have the effect of providing sufficient friction or holding capacity to prevent slippage during a measurement. Surface elasticity may add to capability of holding the breast in position. Additionally, such features can have subtle radio markers or patterns that may be useful as fiduciary markers in an image. When holes are used, they may also be used as access ports for biopsy.

Another aspect of the apparatus and method for improved digital mammography is to use a strain gauge to determine the extent of compressive force being applied on the breast. Since this force is uniform it is expected that a single force value can be used to determine if the breast of a particular patient is over or under compressed thereby allowing for a standardization of compressive force that may vary based on patient age, menopausal stage, demographics and other related factors.

In one embodiment, a pre-measurement is made at one or more select positions on the immobilized breast prior to actual imaging by slot scanning. For example, this pre-measurement may be made at 3 positions, one near the chest wall, one near the nipple and one in between and these measurements can be used to approximate the tissue composition and density among other features that are commonly measured in mammography pre-measurements. In another embodiment, the pre-measurements may be made between about 1 and about 10 positions. The data from this pre-measurement are used as inputs into the AEC algorithm for determining the best AEC parameters for that patient.

A separate aspect of the apparatus and method for improved digital mammography is to use flat plates or paddles as opposed to arcuate plates or paddles for holding and compressing the breast. Scanning systems such as the one described in the U.S. Pat. No. 5,526,394 have compression paddles that have an arcuate shape to facilitate the arcuate trajectory of the detector's movement whilst the detector's surface is always held at right angles to the X-ray beam.

However, arcuate paddles are difficult to use in special imaging modes often used in mammography such as enlargement and spot imaging. It is also difficult to accommodate existing biopsy devices designed for flat paddles for use in arcuate paddles. To address this problem U.S. Pat. No. 7,590,217 (which is incorporated herein in its entirety by reference) teaches using an essentially flat upper and lower compression paddles and a sensor that is kept in synch with the scanning movement of the X-ray beam by moving it along a linear path but tilting its active surface as necessary to keep the surface essentially at right angles to the X-ray beam. This scheme is expected to eliminate or reduce the variability in detector collection efficiency at the edges of the scanning range when compared to the middle. This method, however, introduces additional system cost and complexity and the variability that it attempts to remove can easily be removed by appropriate calibration.

In one embodiment, the apparatus and method for improved digital mammography uses flat paddles and a sensor located below the bottom paddle that does not tilt in its linear movement between the extremes of the scanning movement. In this regard the measurement is similar to the measurement that would have been obtained by using a flat 2D detector such as the ones used in conventional FFDM systems. If necessary, a simple calibration correction such as multiplying the measured values by a set of efficiency factors obtained by measuring a flat acrylic calibration target will correct for variability in efficiency between different scan positions of the detector.

An optional aspect of this invention is to limit radiation to only the area occupied by the patient's breast by first determining the area of contact of the breast on one or both paddles using a method such as contact capacitance, resistance, heat, or similar. The contact surface measuring capability can be built into the paddle itself or onto a pad that determines this area, and which can be removed, without disturbing the breast positioning, before the measurement starts.

Yet another aspect of the apparatus and method for improved digital mammography is that it can use more than one detector in order to make a faster measurement. For example two detectors may be used in tandem where one detector travels from the middle to the anterior end while the other travels from the posterior end to the middle. Clearly two spatially separated fan beams are needed for this scheme, one for each detector and these beams can be obtained from the same X-ray tube using spatially separated apertures on the collimator assembly.

Figure 2A:
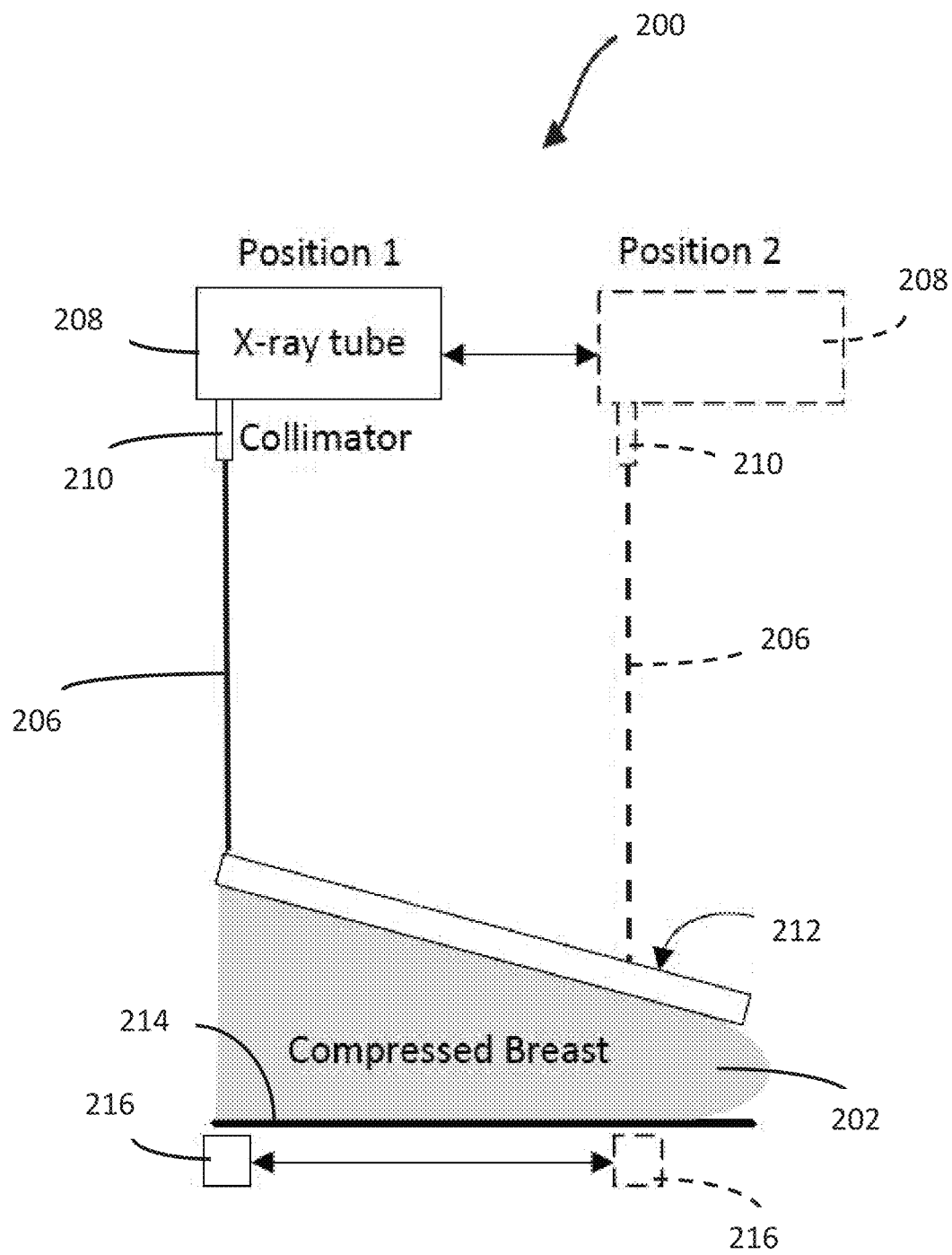
FIG. 2A is a schematic diagram of a system for digital mammography according to one embodiment.

In an alternative embodiment shown in FIG. 2A imaging system 200 is provided where instead of keeping the x-ray tube 208 stationary and moving the collimator 210 alone the x-ray tube 208 along with the collimator 210 is moved. The x-ray tube 208 and collimator may move from a first position to a second position as a result of being on a sliding device, such as a rack that holds the x-ray tube and collimator and has wheels or bearings within a track to facilitate movement. Alternatively, the x-ray tube and collimator may be placed on a device that extends from a structure, such as angled members that scissor out and straighten to move the x-ray tube and collimator from the first position to the second position. In particular, in one example, the x-ray tube and collimator may be coupled to any device or structure that can move the x-ray tube and collimator in a non-arcuate manner, along a straight line. Alternatively, the x-ray tube and collimator may be coupled to a device that may move the x-ray tube and collimator in any direction, including arcuately. In this manner, the x-ray beam 206 can be in precise alignment with the line detector 216 throughout the length of the scan i.e. from anterior to posterior position with respect to the breast 202 or vice versa while the breast is held compressed between a top paddle 212 and the breast support 214. In one example the top paddle can be tilted as described in relation to FIG. 1.

As a result of moving both the x-ray tube 208 and the collimator 210 together and in precise alignment with the line detector 216 from the first position to the second position, several advantages are realized. First, the same fan beam selected from the cone beam of radiation emitted by the x-ray tube can be used over the entire scan length thereby removing any variability in measurement from changing beam profiles. In particular, the x-ray tube 208 and collimator 210 can provide a fan beam as described in relation to FIG. 1.

Figure 2B:
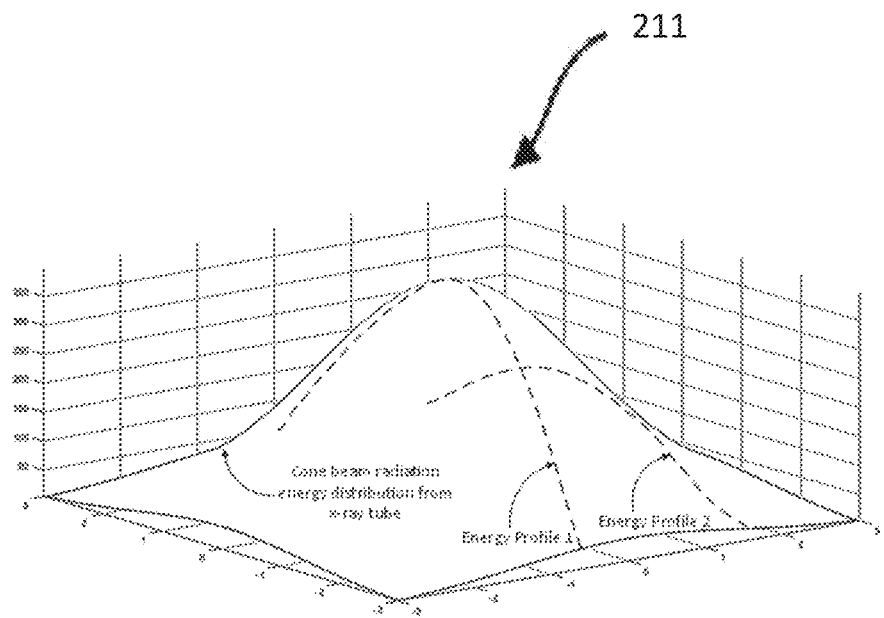
FIG. 2B is a three-dimensional graph of an energy profile of an x-ray beam for breast imaging according to one embodiment.

As illustrated in FIG. 2B the x-ray tube 208 produces a cone beam of radiation with an energy profile 211 that approximates a gaussian. The energy profile 211 of the fan beam that is selected from this cone can therefore change depending upon its location. (FIG. 2B energy profiles 1 and 2). By making the x-ray tube 208 and collimator movable, the same fan beam (and therefore the same energy profile) is utilized to scan the entire breast 202. In other words instead of having a first fan beam energy profile for imaging one portion of the breast 202 and a second fan beam energy profile for imaging a second portion of the breast as illustrated in FIG. 1, only a single fan beam energy profile is utilized. This can eliminate inconsistencies in the measurement due to changing energy beam profiles.

In addition to the advantage of using the same fan beam, the imaging system provides the advantage of having the beam remain nominally orthogonal to the detector for the entire scan length. This advantage is illustrated in the schematic diagram of FIG. 2C. As a result of the beam being orthogonal to the detector 216, beam obliquity artifacts that degrade imaging performance can be removed. When viewing FIG. 2C, the orthogonal x-ray beam 206A provides the shortest distance through the breast 202 to the detector, whereas the angled x-ray beam 206B provides a longer path through the breast 202 that can result in the formation of artifacts. In particular, x-rays that are incident on a detector 216 at a normal angle (orthogonal x-ray beam 206A) can have higher signal intensity and minimize spatial distortions. Meanwhile, oblique x-rays (angled x-ray beam 206B) can cause spatial distortions in an image i.e. it can make a feature in the tissue appear at a location that is different from where it really is. Such a situation can be seen in FIG. 1 where the fan beam would only be orthogonal to a detector over a certain area of the breast. As a result the fan beam in other locations is being received at an angle by a detector that can cause the location of an object to be imaged at an incorrect location. Thus, by positioning the x-ray tube 208 and collimator 210 aligned with the detector such that the beam is nominally orthogonal to the detector, no portion of the beam is received at an angle by the detector. Hence, the improved imaging results.

Figure 2C:
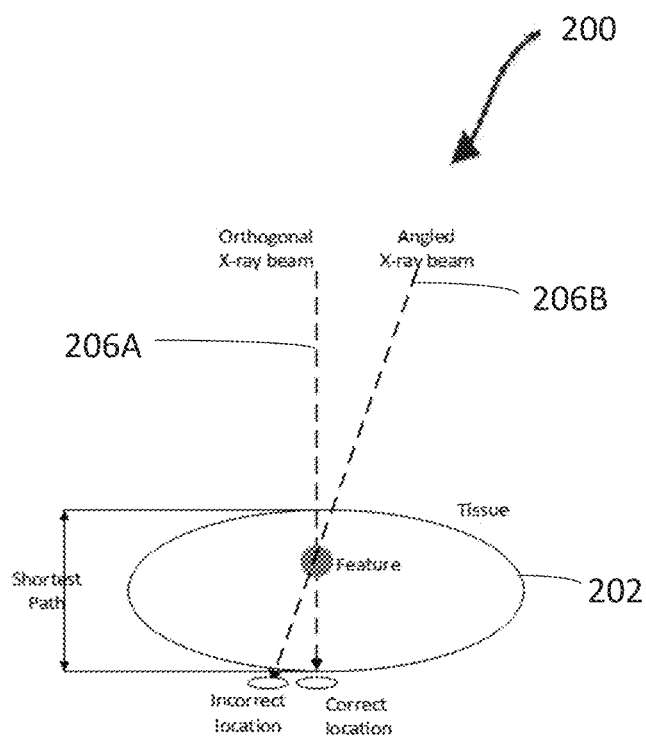
FIG. 2C is a schematic diagram of systems for digital mammography according to one embodiment.

A third advantage of moving the combination of the x-ray tube 208 and collimator 210 in precise alignment with the line detector 216 is that the path length through the breast tissue of an orthogonal or normal incidence x-ray beam is shorter than one at an angle as previously described in relation to FIG. 2C. Because the system provides the x-ray tube 208 and collimator 210 aligned with the detector, the beam passes through the least volume of the breast tissue. This reduces the amount of radiation dose absorbed by the tissue resulting in improved safety for the patient.

Figure 3:
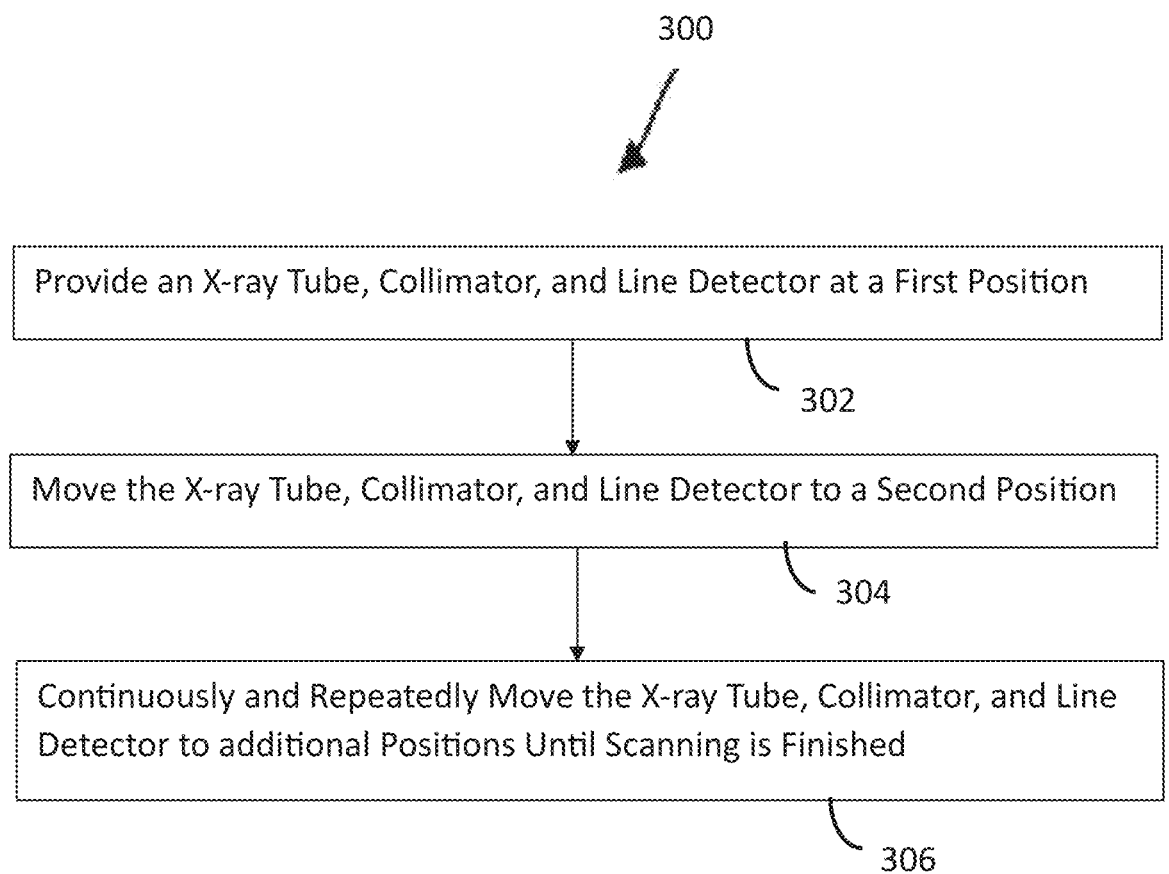
FIG. 3 is a block flow schematic diagram of a method for breast imaging according to one embodiment.

FIG. 3 illustrates a block flow schematic diagram of a method 300 for imaging utilizing an imaging device. In one example the imaging system of FIG. 2 can be utilized to accomplish the steps of the method.

At 302, an x-ray tube and collimator begin at a first position above a breast and aligned with a line detector. In one example the collimator emits a fan beam. In one example, the first position is adjacent to the chest wall of the patient. In another example, the first position can be adjacent to the nipple of the patient. By having the x-ray tube and collimator aligned with the line detector, the line detector does not receive the x-ray at an angle that can cause artifacts in an image. In addition, the shortest path through the breast tissue is presented reducing the amount of tissue exposed to the radiation.

At 304, an x-ray tube, collimator, and line detector are moved from the first position to a second position to scan another portion of the breast. The x-ray tube, collimator and line detector are configured to move from the first position to the second position such that the x-ray tube and collimator remain aligned with the line detector. As a result, the same beam, and in one example, the same fan beam can be utilized to examine both the breast tissue at the first position and the breast tissue at the second position. In this manner, the imaging system provides the same measurement conditions in the second position as in the first position.

At 306, the x-ray tube, collimator, and line detector continuously and repeatedly moved together to positions until the entire breast has been scanned. In each position, the x-ray tube, collimator, and line detector remain aligned such that the advantages of having them aligned can be provided throughout the entire scanning process by a clinician.

Figure 4A:
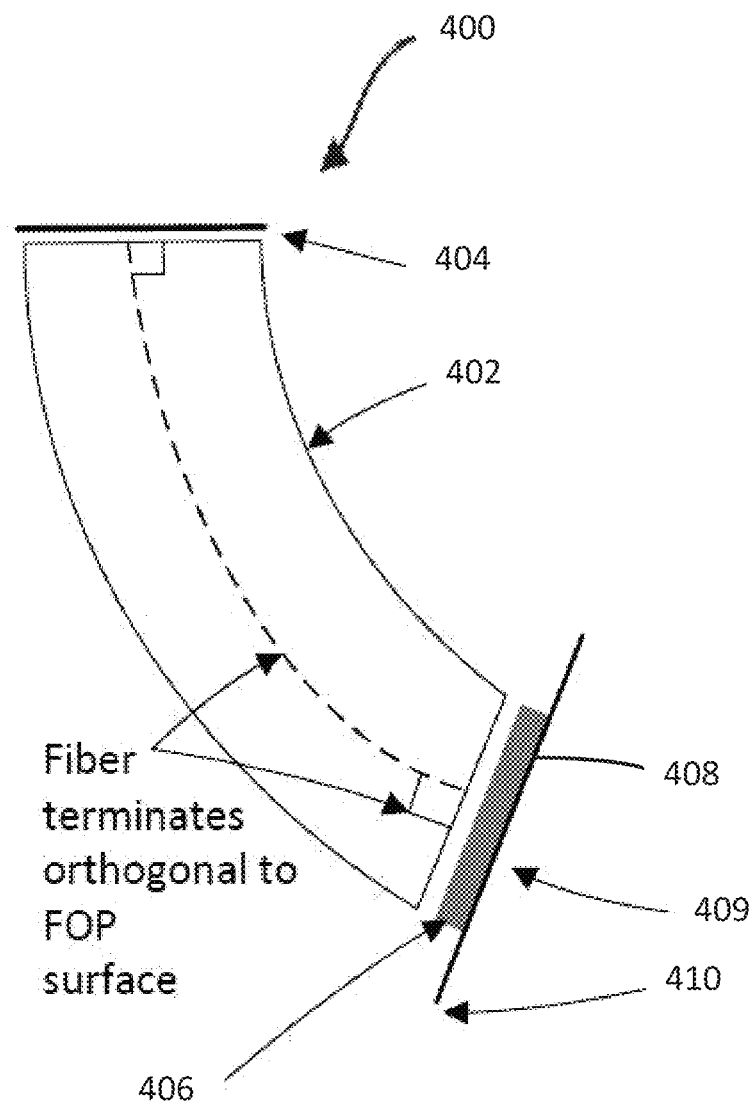
FIG. 4A is a schematic diagram of an imaging system according to one embodiment.
Figure 4B:
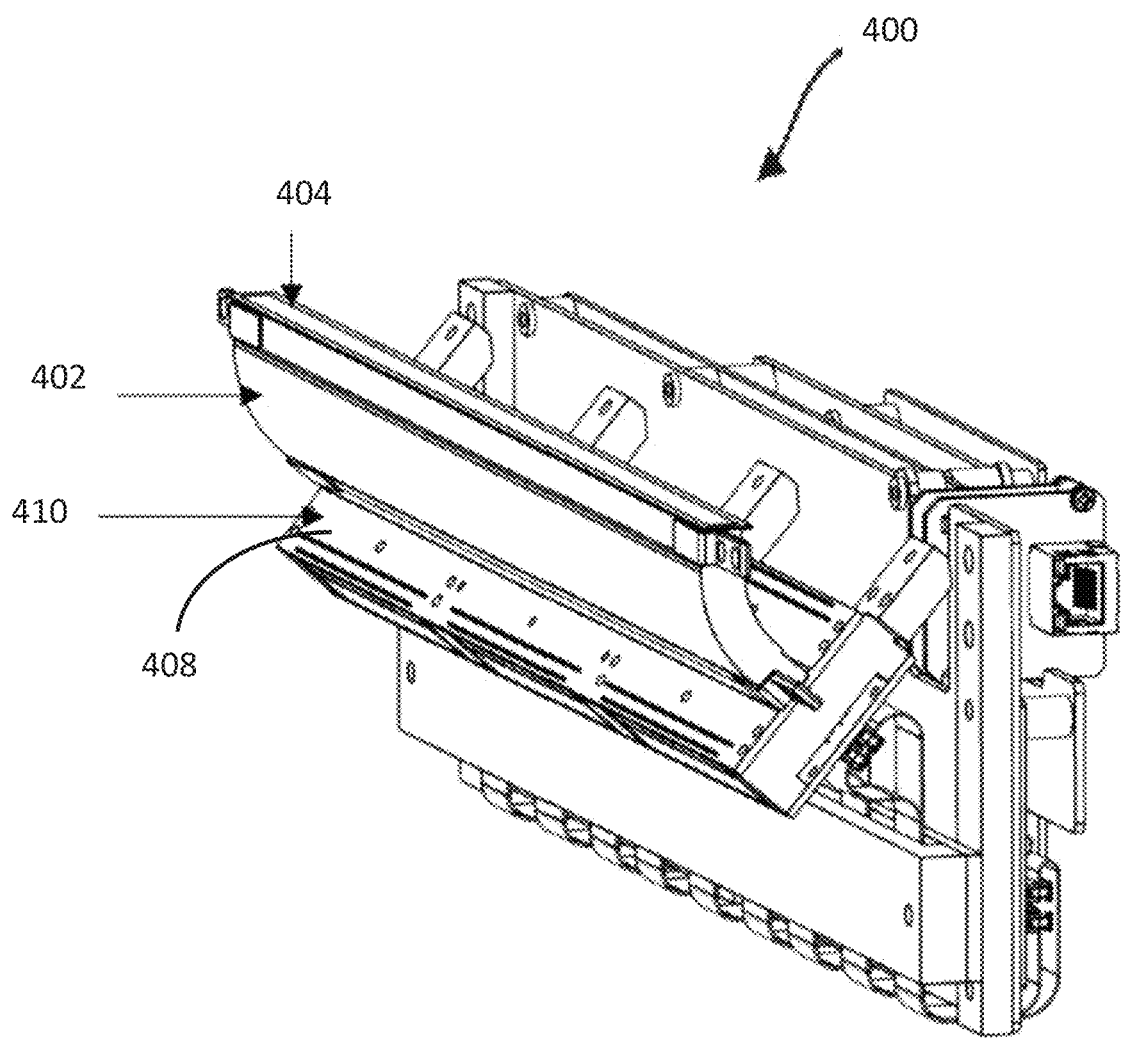
FIG. 4B is a perspective view of a TDI line detector according to one embodiment.

FIGS. 4A and 4B illustrate yet another example embodiment of an imaging system. An important requirement in breast imaging is to image breast features close to the chest wall. Guidelines from the American College of Radiology (Kanal K M, Krupinski E, Berns E A, et al. ACR-AAPM-SIIM practice guideline for determinants of image quality in digital mammography. J. Digit. Imaging. 2013; 26(1):10-25) incorporated herein as a reference, requires that the gap between the chest wall edge of the image receptor and detector edge must not exceed 7 mm. Most TDI line detectors use a scintillator to form visible light photons which pass through a thin fiber optic (2-4 mm thick FOP), image transfer bundle to an image receptor or sensor. The printed circuit boards (PCB), which hold the sensor have a significant gap or overhang (typically greater than 10 mm) between the edge of the image receptor and edge of the PCB in order to accommodate various components, connectors and traces. This prevents meeting the ACR-AAPM-SIIM guideline of keeping the gap between the chest wall edge of the image receptor and detector edge less than 7 mm.

Therefore one aspect provided by the embodiment of FIGS. 4A and 4B is to meet the ACR-AAPM-SIIM practice guideline supra. FIGS. 4A and 4B show schematics of a detector system 400 that can utilize an arcuate fiber optic (FOP) bundle 402 to direct the image forming light from a scintillator 404 to an image receptor 406 on a PCB 408. The combination of the image receptor and the PCB in one example can be considered a sensor 409. In one example the sensor 409 can be a line sensor. The arcuate FOP 402 allows the sensor 409 to be placed remotely so that it becomes possible to effectively bring the image receptor of the detector system close to the chest wall. In one example, the image receptor can be placed effectively at a distance that is less than the 7 mm maximum distance from the chest wall as is required in the guideline. In other words the detector system allows imaging of tissue close to the chest wall (i.e. less than 7 mm) even though the PCB, onto which the image receptor is mounted, may have an overhang 410 significantly greater than 7 mm. Consequently, the detector system 400 makes it possible to use commercially available, mass produced, line sensors that are commonly used in many non-destructive testing (NDT) applications without requiring any customization for this breast imaging application. In one example the sensor 409 can be a time delay integration (TDI) line detector. In another example the sensor 409, and more particularly the image receptor 406 can be either a CCD or a CMOS.

A scintillator 404 as referred to herein can be any substance that emits light, or fluorescence, when exposed to radiation, such as an x-ray. In one example the scintillator may be a phosphor. The PCB 408 can be a substrate that receives and provides electrical communication between electronic components, including sensors, one or more processors, memories, transceivers, resistors, capacitors, transistors, diodes, etc.

To this end, the arcuate FOP bundle 402 i.e., instead of a straight FOP allows the transfer of the image forming light without compromising energy throughput. This is because an arcuate FOP bundle 402 allows individual fibers in the bundle to terminate at right angles, or orthogonal, on both the FOP surfaces thereby fully utilizing the numerical aperture of each fiber and thereby maximizing energy coupling in and out of each fiber. An added benefit of this detector system 400 configuration is that the configuration protects the sensitive electronics on the PCB 408 and the image receptor 406 itself from radiation by keeping it out of the direct path of any x-rays.

In another example embodiment, the detector system 400 can be utilized in the context of standard two shot mammography (CC and MLO) imaging. The use of the detector system 400 can be extended to other views including Medio Lateral (ML) and reverse CC etc. The detector device and system for improved digital mammography can also be used for capturing multiple angular views as are captured in Digital Breast Tomosynthesis or DBT for generating a Three Dimensional or 3D view of the breast. Adoption of DBT has been steadily increasing with increasing evidence of its value in reducing false positives and increasing detection of smaller cancers and lesions. The present invention therefore provides the same benefits to DBT as it does to standard screening mammography.

In an alternative embodiment, the compression paddle used for compressing the breast may have a compression surface made of a taut, transparent membranous sheet instead of a rigid surface. When compared to the rigid polycarbonate or similar material used in compression paddles in today's mammography systems which can be a few millimeters thick, the membranous sheets have the added advantage of generating significantly less x-ray scatter. The membranous sheet may allow a certain degree of flexibility and comfort while being held taut for breast compression. The membranous sheet may be formed from a polymeric material of high tensile strength. Examples of materials that may be used include biaxially oriented polyethylene (BOP), biaxially oriented polypropylene (BOPP), or biaxially oriented polyethylene terephthalate (BoPET) as these can provide the tensile strength needed for compression in thicknesses of less than 50 microns.

Another advantage of using a membranous sheet is that it allows subsequent scanning of the breast using ultrasound as an additional imaging modality following mammography. One example of an imaging system that includes the membranous sheet is provided in U.S. Ser. No. 18/340,337, filed Jun. 23, 2023, entitled Method and Apparatus for Breast Imaging, that is incorporated by reference herein.

Figure 5:
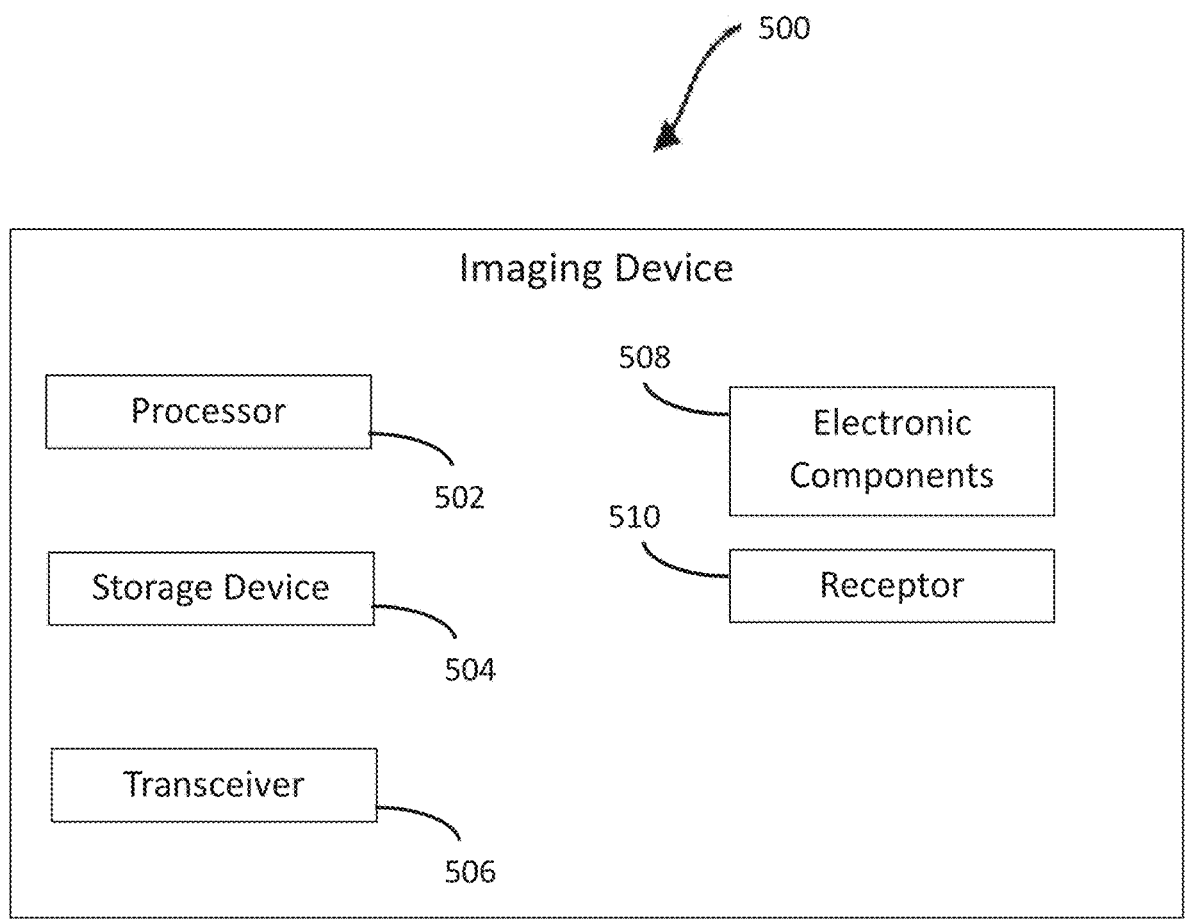
FIG. 5 is a schematic diagram of an imaging system according to one embodiment.

FIG. 5 illustrates an imaging device 500 that in one example can include a printed circuit board (PCB) of any of the previous embodiments described in FIGS. 1-4. In one example, the imagining device 500 includes numerous components of an imaging system. In another example, the imaging device 500 can be an imaging system. The printed circuit board in one example may be a substrate that includes one or more electrical pathways to electrically connect different components on the printed circuit board to one another.

The imaging device 500 can include one or more processors 502 (e.g., a microprocessor, microcomputer, application-specific integrated circuit, etc.), one or more local storage medium (also referred to as a memory) 504, a transceiver 506, electronic components 508, and a receptor 510 all electrically coupled to the PCB. In one embodiment, the imaging device 500 only includes the receptor 510 on a PCB. In another example, the receptor 510 in combination with the PCB may be considered a sensor. All of these components can be operatively coupled to one another, and can be in communication with one another, by way of one or more internal communication links, such as an internal bus.

The memory 504 may encompass one or more memory devices of a variety of forms (e.g., read only memory, random access memory, static random-access memory, dynamic random-access memory, etc.) and can be used by the one or more processors 502 to store and retrieve data. The data that is stored by the memory 504 can include, but need not be limited to, sensor signals, sensor information, operating system data, time-based data, light-based data, or the like. Each operating system includes executable code that controls basic functions of a device, such as interaction among the various components, communication with external devices via the transceiver, transmitting of data, storage and retrieval of data to and from the memory 504, etc. The memory 504 also includes applications that include executable code that utilizes an operating system to provide more specific functionality for the communication devices.

The transceiver 506 can be configured to communicate information, data, signal, or like over a network. In one example, the transceiver 506 provides wireless communication, including cellular, Wi-Fi, Bluetooth link, another wireless link, etc. In one example the transceiver 506 can include a separate receiver and transmitter that receive and transmit the information, data, signals, or the like.

The electronic components 508 can include individual components such as resistors, capacitors, transistors, diodes, or the like. Alternatively, the electronic components 508 may include circuits such as transceiver circuits, imaging circuitry configured to provide a signal for digital imaging, etc. The electronic components 508 can be located at an overhang area of the printed circuit board. The overhand area can be any area of the PCB that is not covered by the receptor 510. An electronic component 508 in one example can be spaced from the receptor 510, while in another example may be in physical contact, or engaging, the receptor 510.

In one example, the printed circuit board is positioned such that the receptor 510 is positioned adjacent and directly underneath an end of an arcuate FOP bundle that emits light. In one example, the end of the arcuate FOP bundle has a cross-section area that is less than the cross-section area of the receptor 510 that detects the light from the arcuate FOP bundle. In this manner, the light can be directionally provided such that all of the light emitted from the end of the arcuate FOP bundle is received by a surface of the receptor 510. As a result of the receptor 510 receiving all of the light from the arcuate FOP bundle, enhanced image data and information is obtained. In addition, the placement of the receptor 510 directly underneath the arcuate FOP bundle end that is not angled and parallel to the surface of the receptor 510 such that the light is received at a ninety degree, or near ninety-degree angle to eliminate potential imaging error that can be created by a receptor 510 receiving angled light. In addition, the arcuate FOP bundle itself functions to space the receptor away from the direct pathway of the x-ray beam. To prevent x-ray radiation that translates through the arcuate FOP bundle from being received by the receptor 510 and electronic components 508 on the PCB. Such additional radiation (e.g., x-rays) from an x-ray beam, ambient light, or the like can cause damage and wear on the electronic components 508 and receptor 510. Consequently, by utilizing the arcuate FOP bundle the life of the imaging device can be increased.

Figure 6:
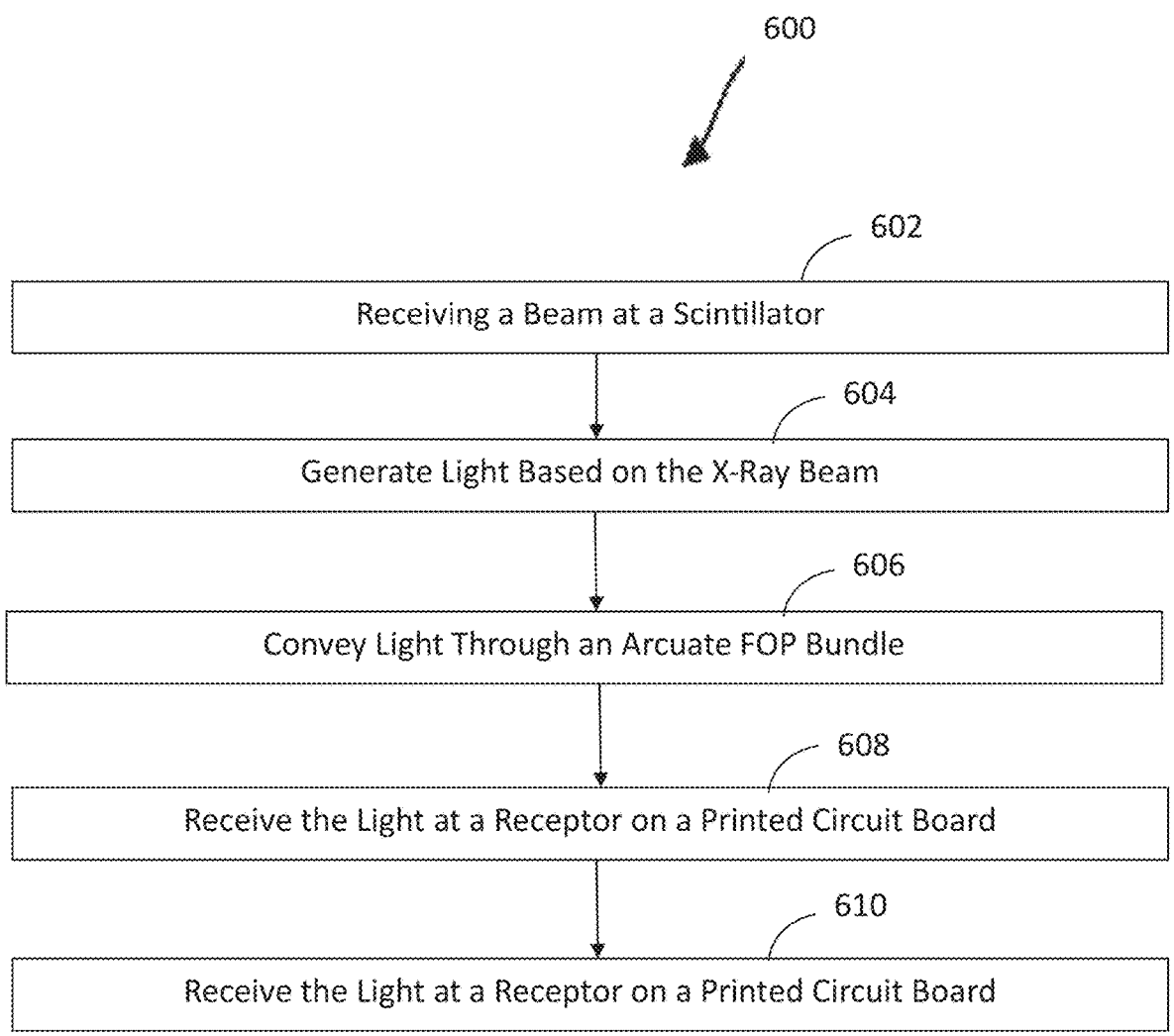
FIG. 6 is a block flow schematic diagram of a method for breast imaging according to one embodiment.

FIG. 6 illustrates a schematic block diagram of a method 600 of scanning a breast to form an image. In example embodiments, the method is accomplished by utilizing any of the systems, devices, apparatuses, components, etc. as described in relation to FIGS. 1-5.

At 602, a scintillator receives a beam emitted from a beam emitter after the beam translates through a breast. In one example the beam can be an x-ray beam. In another example, the beam emitter can include an x-ray tube and a collimator that emits a narrow beam and can move from a first position to a second position. In one example, the beam traverses through a breast being compressed between a top paddle and a breast support. Either one of the top paddle or breast support may be conically shaped to conform to the shape of the breast. In addition, either the top paddle or breast support may be tilted to provide additional stress relief and comfort to the patient.

At 604, the scintillator forms light as a result of receiving the x-ray beam. In one example, the scintillator can be a phosphor that receives radiation and generates a wavelength of visible light in response to receiving the X-ray.

At 606, an arcuate FOP bundle receives the light from the scintillator and coveys the light from a first receiving end to and second transmitting end along an arcuate pathway to adjacent a sensor. The optical fiber(s) are configured to directionally transmit or convey the light along the length and do not diffuse or refract the light. Instead the light follows the arcuate pathway of each fiber such that at the transmitting end diffusion of light does not occur. In this manner the light is directed to the exact location as needed by the system (e.g. onto the surface of a receptor in an orthogonal manner). Consequently, light is not diffused or angled resulting in artifacts or other imaging errors.

At 608, the receptor on a printed circuit board (e.g. a sensor) receives the light from the FOP bundle. As described above, in one example, the light received by the sensor is all of the light emitted by the arcuate FOP bundle such that no other electrical component on the printed circuit board that contains the sensor receive light from the arcuate FOP bundle.

At 610, an image of the breast is formed by an image device that is based on the light received by the receptor. As a result of receiving the light, the receptor communicates a signal, data, information, etc. that can be utilized by an imaging device. The imaging device can include a program, application, or the like that displays an image of the breast based on the signal, data, information, etc. obtained by the sensor. Consequently, a clear image can be provided.

CLOSING STATEMENTS

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

The present embodiments may be incorporated as components into a system or software. A general-purpose computing device in the form of a computing environment, including a processing unit, a system memory, and display. A system bus may couple various system components of the computing environment, including the processing unit, the system memory, and the display. The processing unit may perform arithmetic, logic and/or control operations by accessing system memory. For example, the processing unit may control the various system components to acquire data for imaging and may process the acquired data to generate an image. Alternatively, different system processors, or different devices including, for example, graphical processing units (GPUs) may control the various system components to acquire data for imaging and may process the acquired data to generate an image.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. An imaging system for imaging breast tissue of a breast comprising:
a beam emitter configured to emit a beam directed toward a breast;
a scintillator positioned to receive the beam directed toward and translated through the breast and generate light in response to receiving the beam;
an arcuate fiber optic bundle configured to receive the light from the scintillator and carry the light to a receptor;
wherein the light received by the receptor is utilized to form an image of the breast.

2. The imaging system of claim 1, wherein the scintillator is a phosphor.

3. The imaging system of claim 1, wherein the receptor is coupled to a printed circuit board to form a sensor.

4. The imaging system of claim 3, wherein the arcuate fiber optic bundle is positioned relative to the receptor so that the beam emitted by the beam emitter does not strike an electrical component on the printed circuit board.

5. The imaging system of claim 3, wherein the arcuate fiber optic bundle extends from a first end positioned orthogonal to the light from the scintillator to a second end positioned so the light received by the receptor is orthogonal to the receptor.

6. The imaging system of claim 3, wherein the sensor is a time delay integration (TDI) line sensor.

7. The imaging system of claim 1, wherein the scintillator is coupled to the arcuate fiber optic bundle.

8. An imaging system for detecting light for imaging breast tissue of a breast comprising:
a scintillator positioned to receive a beam after the beam has translated through a breast, the scintillator configured generate light in response to receiving the beam;
an arcuate fiber optic bundle configured to receive the light from the scintillator and carry the light to a receptor;
the receptor configured to receive the light from the arcuate fiber optic bundle and transmit a signal configured to be utilized to form an image based on the light received by the receptor.

9. The imaging system of claim 8, further comprising a sensor having a printed circuit board that includes the receptor and at least one electronic component that is electrically connected to the receptor.

10. The imaging system of claim 9, wherein the arcuate fiber optic bundle is positioned relative to the receptor so that the beam is not emitted on the at least one electronic component on the printed circuit board.

11. The imaging system of claim 9, wherein the sensor is a time delay integration (TDI) line detector.

12. The imaging system of claim 8, wherein the arcuate fiber optic bundle extends from a first end positioned orthogonal to the light from the scintillator to a second end positioned so the light received by the receptor is orthogonal to the receptor.

13. The imaging system of claim 8, wherein the scintillator is a phosphor.

* * * * *